(12) United States Patent
Yin et al.

(10) Patent No.: US 7,778,386 B2
(45) Date of Patent: Aug. 17, 2010

(54) METHODS FOR ANALYTIC RECONSTRUCTION FOR MULT-SOURCE INVERSE GEOMETRY CT

(75) Inventors: Zhye Yin, Schenectady, NY (US); Jed Douglas Pack, Glenville, NY (US); Bruno K. B. De Man, Clifton Park, NY (US); Norbert J. Pelc, Los Altos, CA (US)

(73) Assignees: General Electric Company, Schenectady, NY (US); The Board of Trustees of the Leland Stanford Junior University, Stanford, CA (US)

( * ) Notice: Subject to any disclaimer, the term of this patent is extended or adjusted under 35 U.S.C. 154(b) by 557 days.

(21) Appl. No.: 11/741,359

(22) Filed: Apr. 27, 2007

(65) Prior Publication Data

US 2008/0049891 A1 Feb. 28, 2008

Related U.S. Application Data

(60) Provisional application No. 60/823,703, filed on Aug. 28, 2006.

(51) Int. Cl.
*A61B 6/03* (2006.01)
(52) U.S. Cl. .................................. 378/9; 378/4; 382/121
(58) Field of Classification Search .................... 378/4, 378/9, 210, 901; 382/131
See application file for complete search history.

(56) References Cited

U.S. PATENT DOCUMENTS

| | | | |
|---|---|---|---|
| 7,062,006 B1 * | 6/2006 | Pelc et al. ...................... | 378/9 |
| 2004/0213378 A1 * | 10/2004 | Zhou et al. ................... | 378/122 |
| 2004/0258196 A1 * | 12/2004 | Lounsberry ................... | 378/12 |
| 2006/0210015 A1 | 9/2006 | Pelc et al. | |

OTHER PUBLICATIONS

Schmidt et al., MTF analysis of a prototype table-top inverse-geometry volumetric CT system, Apr. 20, 2005, SPIE, vol. 5745, pp. 171-178.*
Pack ("Image Reconstruction from Truncated Cone-Beam Data", May 2005, Doctoral Dissertation, University of Utah, pp. 1-149.*
Tang et al., Generalized PI-method for helical cone beam reconstruction using a general window function, Jul. 8, 2005, Eighth International Meeting on Fully Three-dimensional Image Reconstruction in Radiology and Nuclear Medicine, pp. 319-322.*
Noo et al., Exact Helical reconstruction using native cone-beam geometries, 2003, Physics in Medicine and Biology, vol. 48, pp. 3787-3818.*

(Continued)

*Primary Examiner*—Edward J Glick
*Assistant Examiner*—John M Corbett
(74) *Attorney, Agent, or Firm*—Global Patent Operation; Jonathan E. Thomas

(57) ABSTRACT

Disclosed are embodiments of methods for reconstructing x-ray projection data (e.g., one or more sinograms) acquired using a multi-source, inverse-geometry computed tomography ("IGCT") scanner. One embodiment of a first method processes an IGCT sinogram by rebinning first in "z" and then in "xy," with feathering applied during the "xy" rebinning. This produces an equivalent of a multi-axial $3^{rd}$ generation sinogram, which may be further processed using a parallel derivative and/or Hilbert transform. A TOM-window (with feathering) technique and a combines backprojection technique may also be applied to produce a reconstructed volume. An embodiment of a second method processes an IGCT sinogram using a parallel derivative and/or redundancy weighting. The second method may also use signum weighting, TOM-windowing (with feathering), backprojection, and a Hilbert Inversion to produce another reconstructed volume.

14 Claims, 12 Drawing Sheets

OTHER PUBLICATIONS

Kohler et al., A fast and efficient method for sequential cone-beam tomography, 2001, Medical Physics, vol. 28, No. 11, pp. 2318-2327.*

"Double-Dentering Method for Increasing Efficiency of Cone-Beam X-Ray CT Reconstruction", A. Hein, M.D. Silver, and K. Taguchi, 2002.

* cited by examiner

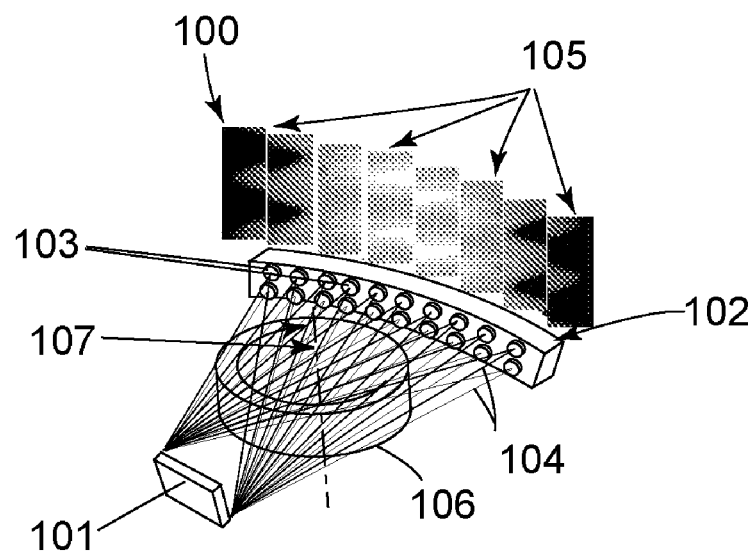
**FIG. 1
(Related Art)**
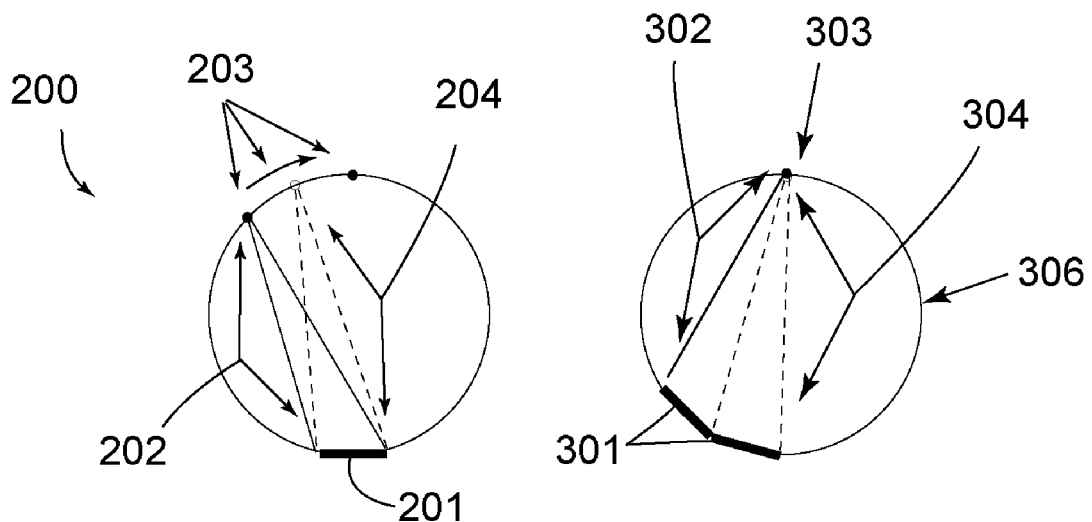
**FIG. 2
(Related Art)**
**FIG. 3
(Related Art)**

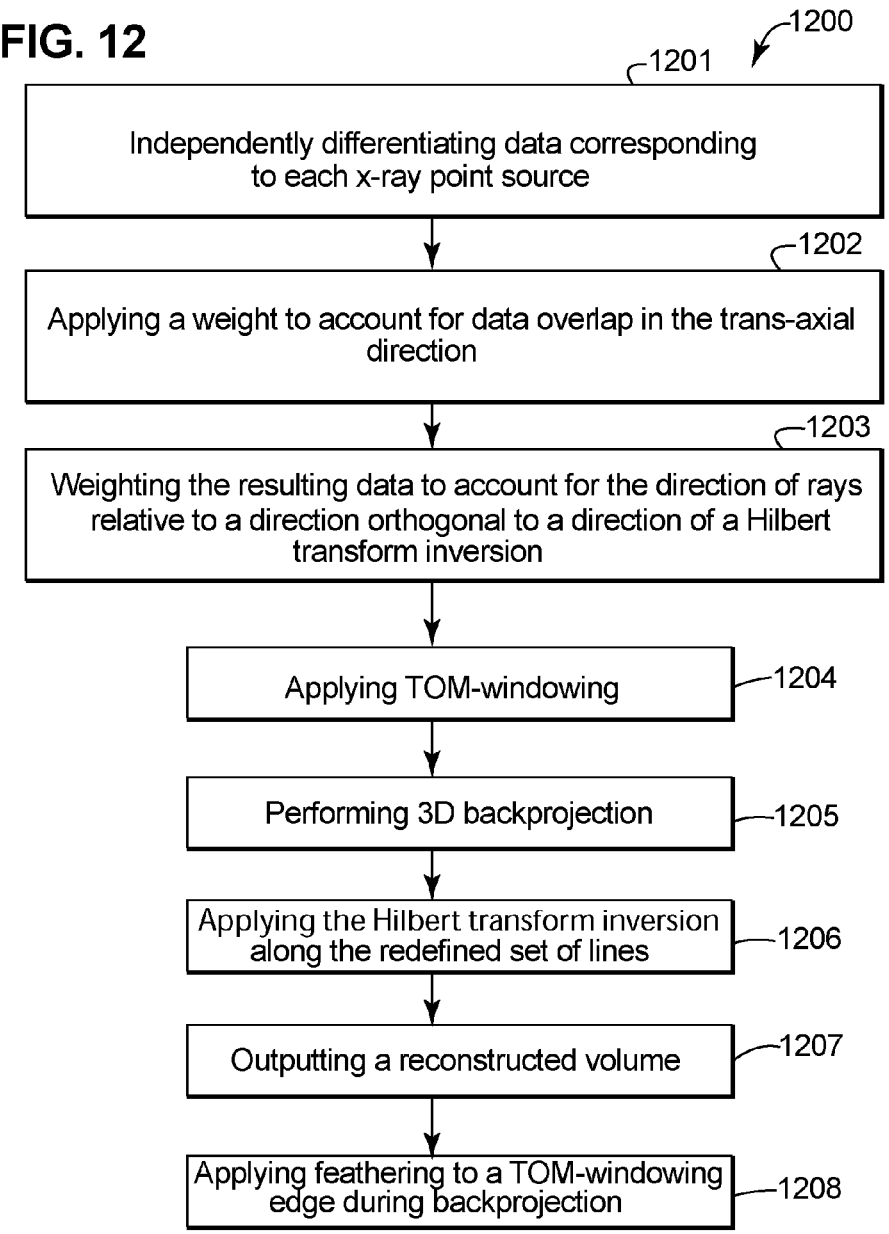
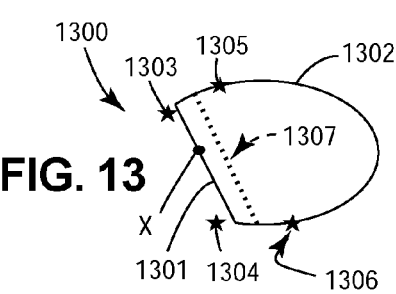
FIG. 13
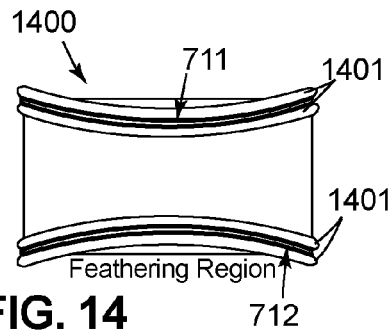
FIG. 14

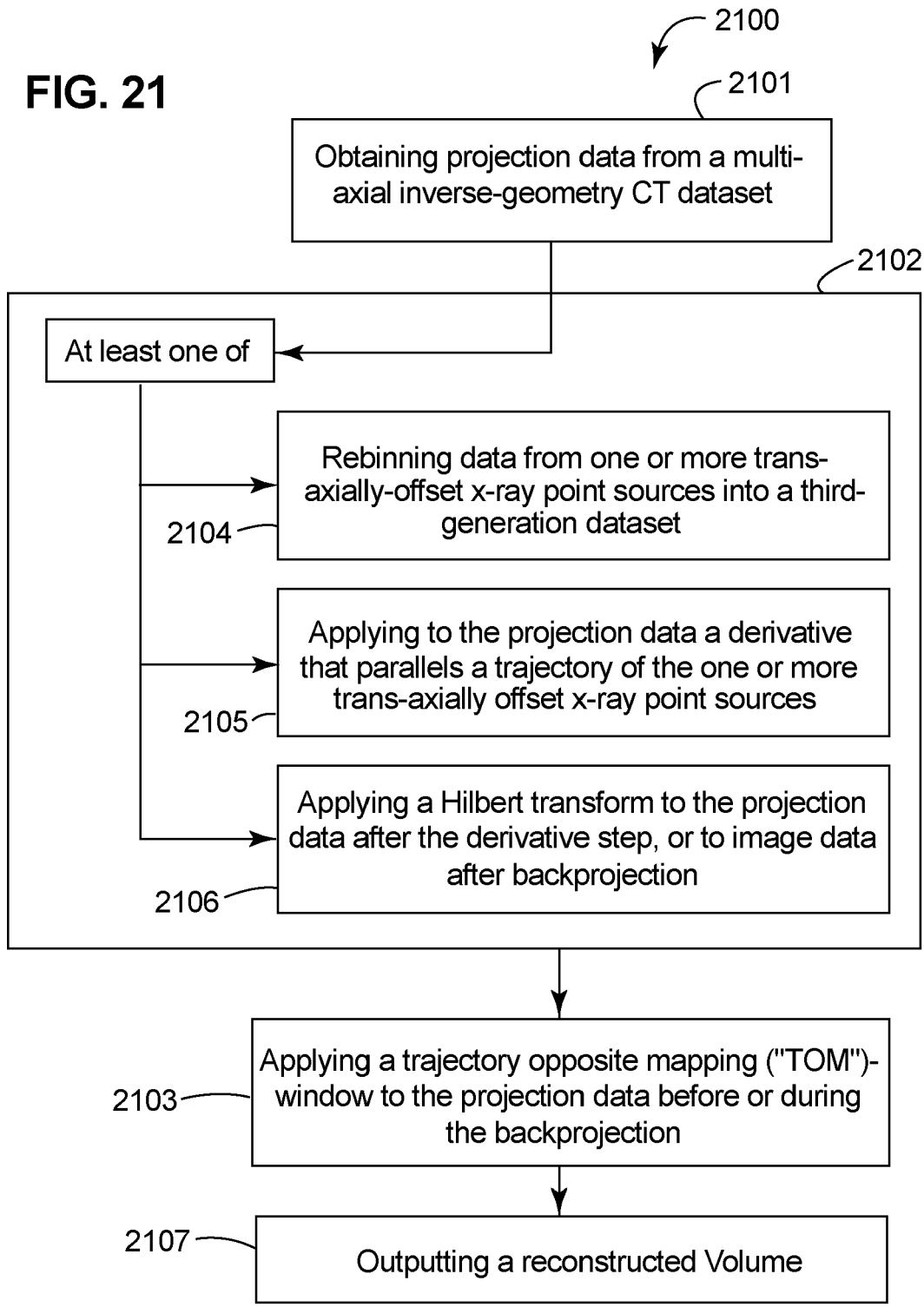

METHODS FOR ANALYTIC RECONSTRUCTION FOR MULT-SOURCE INVERSE GEOMETRY CT

CROSS-REFERENCE TO RELATED APPLICATIONS

This application claims priority to U.S. Provisional Patent Application No. 60/823,703, filed Aug. 28, 2006, which is herein incorporated by reference in its entirety.

STATEMENT REGARDING FEDERALLY SPONSORED RESEARCH OR DEVELOPMENT

This invention was made with Government support under contract EB006837 awarded by the National Institutes of Health. The Government has certain rights in this invention.

BACKGROUND

1. Field of the Invention

The field of the invention relates to x-ray scanners and, more particularly, to multi-source inverse geometry CT ("IGCT") systems.

2. Description of Related Art

Most modern CT scanners are based on a $3^{rd}$ generation architecture, which embodies a single X-ray source and a large X-ray detector. The X-ray detector can be a 1-dimensional—usually curved-array of detector cells, resulting in fan-beam geometry. In axial scans (i.e. the patient table does not move during the gantry rotation) the result is a purely planar dataset to which two-dimensional ("2D") filtered backprojection (FBP) can be applied. Reconstruction is theoretically exact, and any possible image artifacts may come from physical limitations of the scanner, such as quantum noise, aliasing, beam hardening, and scattered radiation.

In the early 1980's, helical (or spiral) CT systems were introduced. Such systems acquired data faster by translating the patient table during the gantry rotation. In a helical CT system, the raw CT data is typically interpolated to 2D planar datasets as if it was acquired without table translation, and 2D FBP is applied.

Since about 1990, multi-slice or multi-detector-row CT systems have become the standard CT architecture for premium medical scanners: the detector has multiple rows, i.e. a 2-dimensional array of detector cells, resulting in cone-beam geometry. Since these geometries do not result in planar datasets, 2D image reconstruction algorithms will not be based on the correct scan geometry and may result in cone-beam artifacts. For axial scan mode, Feldkamp, Davis, and Kress proposed a three-dimensional ("3D") cone-beam reconstruction algorithm ("FDK algorithm") that adapts 2D fan-beam filtered backprojection (FBP) to cone-beam geometry. The FDK algorithm works well near the mid-plane and near the center of rotation, but artifacts occur and get worse as the cone angle increases. For 40 mm-coverage scanners (which typically corresponds to about a 4 degree cone angle) significant artifacts occur, particularly towards the z=−20 mm and z=20 mm slices. The raw CT data is actually fundamentally incomplete in 3D axial scans, and therefore, even the best thinkable algorithm will result in artifacts in some cases.

On the other hand, in helical cone-beam scans, the data is fundamentally complete (provided the table speed is not too high compared to the gantry rotation speed and the slice thickness) and therefore exact reconstruction is possible. The FDK algorithm has been adapted for helical scan modes, but results in non-exact or approximate reconstruction. Accordingly, exact 3D helical cone-beam reconstruction algorithms ("Katsevitch algorithms") have been developed, which perform filtering operations along special filter lines followed by backprojection. Disadvantages associated with the Katsevitch algorithms are that such algorithms assume the detector surfaces are continuously sampled, and that such algorithms have other associated limitations.

Another disadvantage associated with the fan-beam and cone-beam geometries discussed above is that each type of geometry has a limited field of view ("FOV"). In a fan-based geometry, the FOV is an area of a scannable object that constantly receives an x-ray beam as the source and detector rotate around the scannable object. At some image voxels outside the FOV, the projection data is incomplete. Consequently, the size of the FOV and how many artifacts (if any) it contains are important, the goal being to make the FOV as large as possible and as free of as many artifacts as possible. In conventional CT systems, the size of the FOV is proportional to the trans-axial size of the x-ray detector. The larger the detector, the larger the FOV will be, and vice versa. Increasing the size of the detector makes the FOV larger but is technically difficult and costly to implement.

As an alternative to using a larger detector to cover the field of view (FOV), an Inverse Geometry computed tomography (IGCT) system 100 (shown in FIG. 1) has been developed that uses a small detector 101 combined with a large distributed source 102, on which multiple x-ray point sources 103 are arrayed trans-axially (in the xy-plane) and longitudinally (along the z-axis). Each x-ray point source 103 emits a fan-beam (or a cone-beam) 104 at different times, and the projection data (e.g., sinograms) 105 is captured by the detector 101. Additionally, the detector 101, the distributed source 102, and the fan beams (or cone-beams) 104 may be axially rotated about a rotational axis 107. The projection data 105 captured by the detector 101 is processed to reconstruct an object of interest within the field of view 106. A known rebinning algorithm may be used to rebin the projection data into parallel ray projections.

Trans-axially, the multiple x-ray point sources 103 are positioned preferably on an iso-centered arc so that all corresponding fan beams (or cone beams) 104 can be rotated to fit into conventional $3^{rd}$ generation system with an iso-focused detector. This makes exact re-binning to full cone beams possible and also helps to achieve a uniform beam profile. The resulting dataset can be re-arranged or re-binned into multiple longitudinally offset third-generation datasets. An algorithm developed for multiple x-ray point sources 103 distributed in z can also be applied to multiple longitudinally-offset axial scans with a conventional $3^{rd}$ generation CT, and vice versa. While positioning the sources on isocentric arcs is desirable for these reasons, other arrangements, such as detector-centered arcs and flat arrays, can also be used.

An embodiment of multi-source projection data re-binning is shown in FIGS. 2 and 3. In FIG. 2, a multi-source IGCT system 200 includes a single x-ray detector array 201 and a plurality of x-ray point sources 203, which are arranged along an iso-centered arc at a predetermined radius from the x-ray detector 201. In use, each x-ray point source 203 projects a beam 202, 204 onto the detector 201. Each beam 202, 204 creates a sinogram (not shown). Thus, as can be appreciated from FIG. 2, raw projection data from the multi-source IGCT system 200 comprises a group of sinograms that are generated by the x-ray point sources 203.

In FIG. 3, a conventional $3^{rd}$ Generation CT system 300 is shown that comprises a single x-ray source 303 positioned at a predetermined distance from at least two detector arrays 301 that are aligned along an iso-centered arc. Comparing FIGS.

2 and 3, it is seen that the beam 202 in the IGCT system 200 corresponds to the beam 302 in the $3^{rd}$ Generation CT system 300, and that the beam 204 in the IGCT system 200 corresponds to the beam 304 in the $3^{rd}$ Generation CT system 300. Consequently, sinograms that correspond to the beams 202, 204 in FIG. 2 and that are in the same trans-axial plane may be combined and re-arranged by a re-binning process. When each x-ray point source 203 on the same trans-axial plane is positioned on the same iso-centered circle (e.g. shifted to the point occupied by the single point source 303 in FIG. 3), exact rebinning is possible, As FIG. 3 illustrates, the resulting re-binned sinogram will exactly correspond to a sinogram from a $3^{rd}$ generation system having multiple flat panel detectors 301 positioned along an iso-centered circle 306.

Multi-source IGCT 3D rebinning may use any of the following three techniques (or combinations thereof): (1) z-re-binning, (2) trans-axial (xy) rebinning, and (3) feathering between sub-views, each of which is further described below.

The z re-binning technique re-bins the IGCT projection data for example to a source-focused-detector geometry. For example, each sinogram may be rebinned using 1D linear interpolation with extrapolation. Depending on the new source-to-iso-center distance, a larger detector height may be required to capture all the information.

The trans-axial (xy) rebinning technique further rebins the IGCT projection data to a third generation geometry with a source-focused detector. To perform trans-axial rebinning, the angle and the distance from center for each ray are computed and interpolated into the desired geometry.

A process called "feathering" is used in situations where some mismatch may occur between measurements at the edge of the detector array across neighboring sub-sinograms. To mitigate this discontinuity, a slightly larger detector can be used, such that there is some overlap between neighboring sub-sinograms. The overlapping channels are multiplied with linearly decreasing/increasing weights and added together with the weighted channels from the adjacent sub-sinograms.

FIG. 4 illustrates multi-source IGCT projection data 401 that is re-binned and/or feathered to produce a re-binned $3^{rd}$ generation sinogram 402.

After the re-binning described above has been performed, the resulting multiple $3^{rd}$ generation sinograms are associated with x-ray point sources 103 offset along the z-axis (as illustrated in FIG. 5). Therefore, any conventional 3D cone-beam reconstruction algorithm—such as FDK—can be used to reconstruct each of the $3^{rd}$ generation datasets. With multiple sinograms from different sources in z-axis, combining this projection data results in better reconstructions as compared to a single third-generation dataset. This is especially true since cone beam artifacts due to data insufficiency may be reduced using additional information from longitudinally offset data. Also, with multiple sources distributed in z, the scan coverage can be increased without sacrificing image quality due to those cone-beam artifacts.

FIG. 6 is a diagram 600 illustrating a method for reconstructing the re-binned multi-slice IGCT projection data of FIG. 5. Referring to FIG. 6, one way to combine the sinogram information to produce more accurate reconstructions is to combine the data in the image domain. First the slices 601, 602, 603, 604, 605, 606, 607, 608, and 609 corresponding to each dataset (each source z location) are reconstructed, with one set of slices (or reconstructed volume) for each dataset. In FIG. 6, each dataset 610, 620, 630 comprises three sets of slices. For example, a first dataset 610 comprises slices 601, 602, and 603. A second dataset 620 comprises slices 604, 605, and 606. A third dataset 630 comprises slices 607, 608, and 609. These three datasets are then combined by using only the slice from the nearest source, or by applying a weighted average. For example, with three sources along the z-axis, the reconstruction from the center source will suffer from cone-beam artifacts at the top slices and the bottom slices. But the reconstruction volume from the top source will provide artifact-free top slices, and analogous for the bottom source. So essentially, in this embodiment, for every z-position, the best slices 601, 605, 609 from the three reconstruction volumes associated with each source are chosen and combined into a single volume 640.

Unless corrected, this approach has several unfavorable properties. First, the geometry has asymmetric cone angles. Considering three linearly adjacent x-ray point sources for purposes of illustration, outermost x-ray point sources will each have a cone angle that is twice as large as for the center x-ray point source. Second, some portions of the volume will receive more x-ray radiation than others, and some of that dose will be used inefficiently and the image noise will be non-uniform.

Still needed are methods for increasing FOV in IGCT systems without sacrificing image quality. Embodiments of such methods should ideally also provide uniform cong angles, a uniform flux distribution throughout a scanned region of interest, and uniform image noise.

BRIEF DESCRIPTION

Disclosed are embodiments of methods for reconstructing x-ray projection data (e.g., one or more sinograms) acquired using a multi-source, inverse-geometry computed tomography ("IGCT") scanner. One embodiment of a first method processes an IGCT sinogram by rebinning first in "z" and then in "xy," with feathering applied during the "xy" rebinning. This produces an equivalent of a multi-axial $3^{rd}$ generation sinogram, which may be further processed using a parallel derivative and/or Hilbert transform. A TOM-window (with feathering) technique and a combined backprojection technique may also be applied to produce a reconstructed volume. An embodiment of a second method processes an IGCT sinogram using a parallel derivative and/or redundancy weighting. The second method may also use signum weighting, TOM-windowing (with feathering), backprojection, and a Hilbert Transform Inversion to produce a reconstructed volume. The phrase "signum weighting" refers to a weighting method that uses a function (an example of which is $f(x)=sign\emptyset$) which will return 1 for positive values and $-1$ for negative values). As a skilled artisan will appreciate, the terms "Hilbert Transform" and "Hilbert Transform Inversion" are not interchangeable. The Hilbert Transform is its own inverse, but when the Hilbert Transform is performed in the image domain, it cannot be done using a simple convolution because the data is not available over an infinite domain. Accordingly, a Hilbert Transform performed in the image domain is called a "Hilbert Transform Inversion."

BRIEF DESCRIPTION OF THE DRAWINGS

FIG. 1 is a three-dimensional perspective view of a multi-source IGCT system;

FIG. 2 is a diagram that illustrates a geometry of x-ray beams produced by multiple individual point x-ray sources in the multi-source IGCT system of FIG. 1;

FIG. 3 is a diagram that illustrates how projection data from the IGCT system of FIG. 2 may be exactly re-binned to correspond to the projection data obtained by a $3^{rd}$ Generation CT system having only a single x-ray source and multiple x-ray detectors;

FIG. 12 is an embodiment of a method that combines TOM-window and DBP approaches;

FIGS. 13 and 14 are diagrams illustrating that a binary windowing operation may generate artifacts because only a finite number of discrete view samples will be taken during actual scanning;

FIG. 21 is a flowchart of an embodiment of a method of performing analytic reconstruction for a multi-axial, IGCT dataset.

If necessary, one or more method steps shown in one of the Figures (and/or described herein) may be combined (and/or performed) in any suitable order with one or more method steps shown in any of the other accompanying Figures (and/or described herein).

DETAILED DESCRIPTION

Embodiments of the invention analytically reconstruct projection data obtained by an IGCT system to provide a number of advantages over the prior approaches discussed above. One such advantage is the ability to increase field-of-view ("FOV") in IGCT systems without sacrificing image quality. Other advantages include providing uniform cone angles, a uniform flux distribution throughout a scanned region of interest, and uniform image noise.

These and other advantages may be achieved, in part, by using a technique labeled trajectory opposite mapping window (hereinafter, "TOM-window"). The TOM-window is a modification of a known TAM-window used in some helical reconstruction algorithms. The TAM-window is so-called after one of its inventors, Kwok Tam, and is defined as the projection of a helical source trajectory onto a detector. When a TAM-window is used only the portion(s) of the detector confined by the TAM-boundaries (e.g., edges of the projections of the helical source trajectory) is/are used to reconstruct the desired volume. The TOM-window modifies and extends the TAM-window concept to handle multiple-circle acquisitions that are offset in the z-direction.

Figure 7:
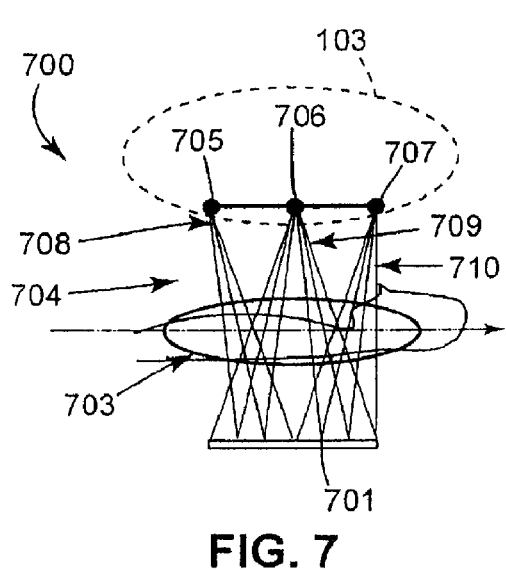
FIGS. 7 and 8 are each diagrams that illustrate an embodiment of trajectory opposite mapping ("TOM")-window-based reconstruction that uses symmetric cone angles formed by x-ray point sources that are arranged about an iso-centered arc.
Figure 8:
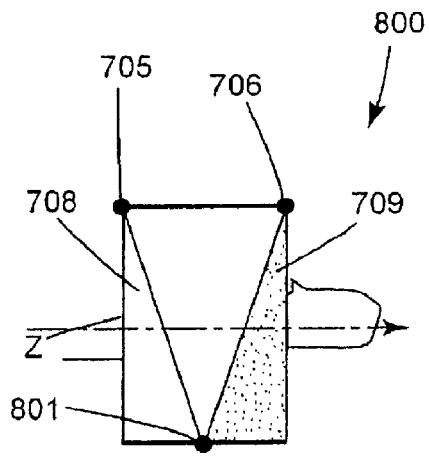

FIGS. 7 and 8 are each diagrams 700, 800, respectively, that illustrate an embodiment of TOM-window-based reconstruction that uses symmetric cone angles formed by x-ray point sources that are arranged about an iso-centered arc. In the embodiment illustratively shown in FIGS. 7 and 8 and described herein, only three x-ray point sources 705, 706, 707 distributed along a single (z) axis are shown for simplicity; but, the same principle can be applied to an embodiment with two or more x-ray point sources that are distributed along a single axis, and to an embodiment with two or more x-ray point sources on 2 or more arcs that are trans-axially distributed.

Referring to FIG. 7, a set 103 of adjacent x-ray point sources 705, 706, 707 is disposed along a z-direction and separated from a single x-ray detector 701 by a predetermined distance. A patient (or object to be evaluated) 711 is removably positioned between the set 103 of point x-ray sources 705, 706, 707 and the x-ray detector 701. X-rays 704 emitted by each of the point x-ray sources 705, 706, 707 pass through a target area 703 of the patient's body before impinging the x-ray detector 701.

The x-rays 704 emitted from the x-ray point sources 705, 706, 707 form symmetric cone angles 708, 709, 710, respectively. Although FIG. 7 illustratively depicts simultaneous generation of x-rays 704 for the purposes of illustrating the symmetry of the symmetric cone angles 708, 709, 710, it should be understood that in practice, each x-ray point source 705, 706, 707 may be activated at a different time.

Referring to FIG. 7, a set 103 of adjacent x-ray point sources 705, 706, 707 is disposed along a z-direction and separated from a single x-ray detector 701 by a predetermined distance. A patient (or object to be evaluated) is removably positioned between the set 103 of point x-ray sources 705, 706, 707 and the x-ray detector 701. X-rays 704 emitted by each of the point x-ray sources 705, 706, 707 pass through a target area 703 of the patient's body before impinging the x-ray detector 701.

In an embodiment, the TOM-window is chosen such that there is no overlap between the beams from two adjacent x-ray point sources 705, 706, as illustrated in FIG. 8. Alternatively, just like in the trans-axial case there can be some overlap, in which case some feathering may be applied. Disregarding this overlap (for simplicity and purposes of illustration only), the symmetric cone angles 708, 709 from complimentary x-ray point sources 705, 706 adjoin so that projection data between the TOM-window boundaries is enough to reconstruct the entire volume. This means that rays from adjacent x-ray point sources 705, 706 will intersect each other at the iso-center 801.

After applying the TOM-window technique as illustrated in FIG. 8, the projection data from adjacent x-ray point sources covers mutually exclusive portions of the longitudinal scan range, and this particular detector collimation provides several benefits. First, all x-ray point sources have an identical (or substantially similar) worst-case cone-angle. Second, the x-ray flux throughout the target area of the object/subject being evaluated is very uniform. Finally, and correspondingly, image noise is relatively uniform. Thus, by applying embodiments of the TOM-windowing techniques herein described, a relatively uniform x-ray dose over a target area of an object may be achieved. Achieving a uniform x-ray flux over the target area not only offers an advantage of preventing a patient from receiving too much radiation, but also offers an advantage of increasing the efficiency of the administered dose.

Figure 9:
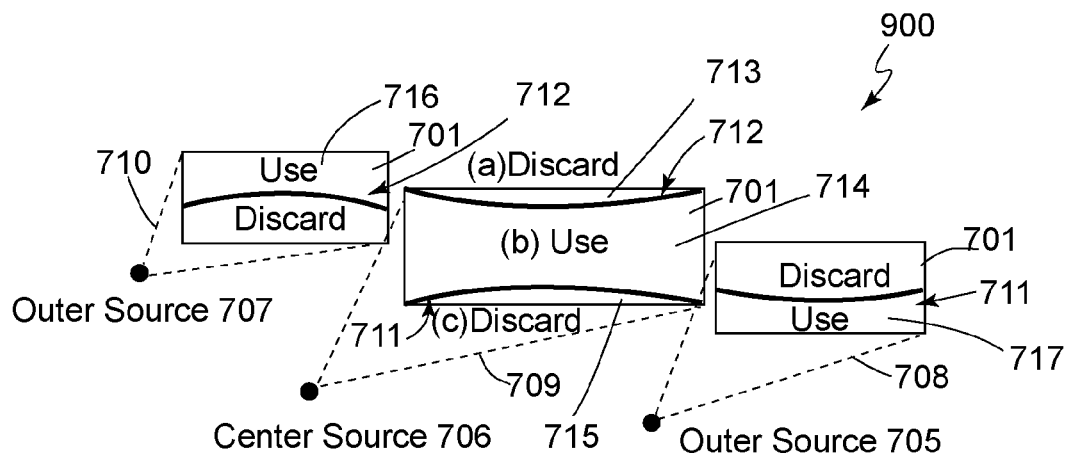
FIG. 9 is a diagram illustrating TOM-window boundaries for the x-ray point sources illustratively shown in FIG. 7.

FIG. 9 is a diagram 900 illustrating TOM-window boundaries 711, 712 for the x-ray point sources 705, 706, and 707 illustratively shown in FIG. 7. In the embodiment of FIGS. 7 and 9, for the center x-ray point source 706, two axial trajectories—one from the top x-ray point source 707 and another from the bottom x-ray source point 705—can be projected onto the physical detector 701. These projected trajectories will form TOM-boundaries 711, 712 which bound the top and bottom of detector 701. For the center x-ray point source 706 for example, we have three areas to be considered. The first area on the detector 701, is the region 713 outside the top TOM-boundary 711 (e.g., a projection of the trajectory of the top x-ray point source 707). The second area on the detector 701 is the region 714 between the two TOM-boundaries 711, 712. The third area on the detector 701 is the region 715 outside the bottom TOM-boundary 712 (e.g., the projection of the trajectory of the bottom x-ray point source 705). In this embodiment, when reconstructing a voxel (or any point in the image volume) whose projection onto the detector 701 is in region 713, that particular view is not used (i.e. backprojection of that view is not applied to that voxel), because data 716 from the top x-ray point source 707 will be used there instead (and hopefully also provide better or more complete information for that particular angle). Similarly, if the projection of a voxel falls in region 715, that view is not backprojected, because data 717 from the bottom x-ray point source 705 will be used there instead.

Figure 10:
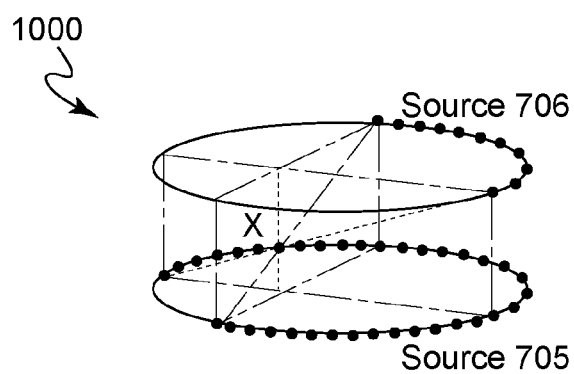
FIG. 10 is a diagram illustrating how in an embodiment of TOM-window-based backprojection, some views contribute to a voxel and others do not.

In another embodiment, TOM-windowing may be achieved by applying a binary mask to the filtered sinogram, but this approach suffers from quantization artifacts. In another embodiment, the TOM-window may be implemented by making a decision during the backprojection of each voxel for each view that determines whether or not the voxel projects inside of the Tom-window. This implementation has less quantization error, but higher computational complexity. The diagram 1000 of FIG. 10 illustrates how in an embodiment of TOM-window-based backprojection, some views from x-ray point source rings 705, 706 contribute to a voxel X and others do not.

Parallel Derivative and Hilbert Transform

A known FDK reconstruction algorithm employs a ramp filter in its filtering step, which works well for a full axial scan. However, using a ramp filter is no longer optimal when disjoint source path segments are combined through TOM-windowing, as noted above. An embodiment of the invention therefore provides a different and advantageous approach (e.g., method) that (in a first step) computes a parallel derivative (a.k.a., "a view dependent derivative") by combining a derivative along a detector row with a derivative in the source coordinate, and then (in a second step) applies a Hilbert transform.

In an embodiment of this method, the view derivative can be computed at interlaced sampling locations. For example, noting that an axial scan is simply a helical scan with pitch=0, a technique for computing a view derivative at interlaced intervals for a helical trajectory may be used, as described in F. Noo, J. Pack, D. Heuscher, "Exact Helical Reconstruction Using Native Cone-Beam Geometries," *Phys. Med. Biol.*, vol. 48 (2003), pp. 3787-3818. However, in other embodiments, other techniques known to a skilled artisan for computing the view derivative may also be used.

Additionally, the Hilbert transform may be applied with a half pixel shift (a process also described in the above paper) directly along the rows of the detector. In an embodiment, this may be accomplished by convolving the differentiated sinogram with the kernel of the Hilbert transform and ascribing the result to sample positions that are offset by one half of a pixel along the row direction.

Accordingly, it is therefore possible to use embodiments of the TOM-windowing technique described herein without introducing artifacts as a result of the discontinuous view weights that could appear with ramp-filter based approaches.

Derivative Backprojection (DBP) Approach

Figure 11:
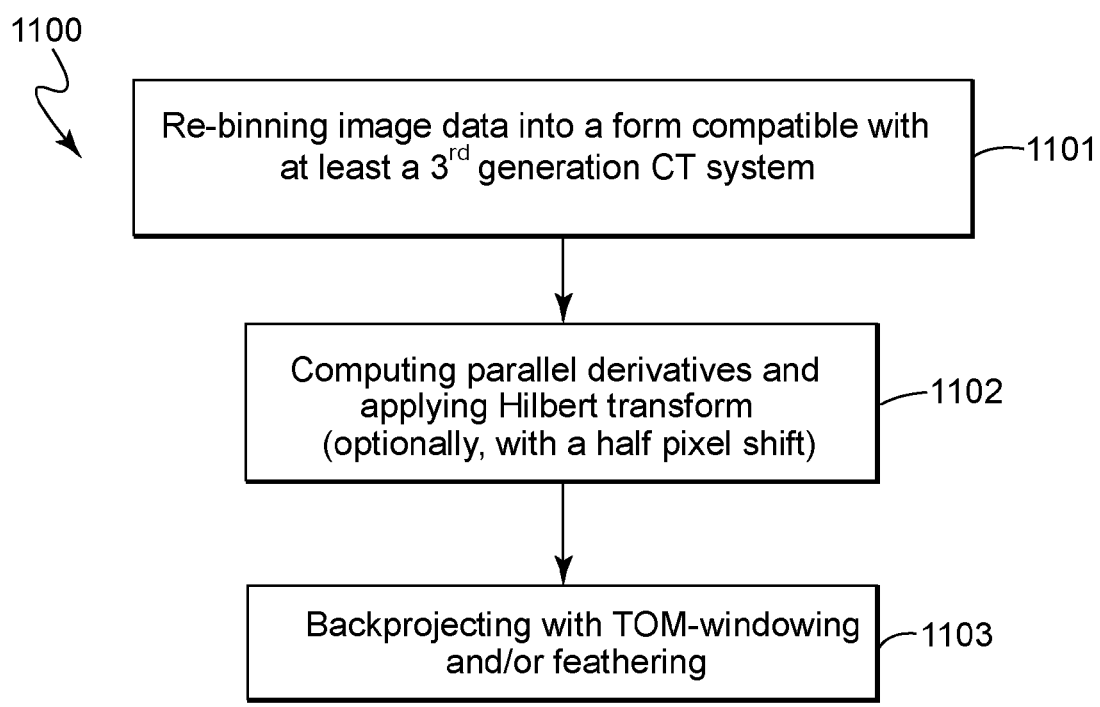
FIG. 11 is a flowchart of an embodiment of a Parallel Derivative and Hilbert Transform technique.

FIG. 11 is a flowchart 1100 of an embodiment of the Parallel Derivative and Hilbert Transform technique described above, which may be summarized as comprising the following method steps: (1101) re-binning projection data into a form compatible with at least a $3^{rd}$ generation CT system, (1102) computing parallel derivatives and applying Hilbert transform, and (1103) backprojecting with TOM-windowing and/or feathering. The first method step 1101 can degrade the data quality since it relies on interpolation. However, modifying the method 1100 to include a derivative backprojection ("DBP") approach, causes the Hilbert transform to be applied in the image domain (after backprojection) rather than in the projection domain. This leaves only the derivative step to be applied in the projection domain and since the derivative is a local operation, this allows the backprojection for each trans-axial x-ray point source to be done independently of the data from other x-ray point sources. Thus, the rebinning step 1101 becomes unnecessary.

FIG. 12 is an embodiment of a method 1200 that combines the TOM-window technique and DBP approach described herein. The method 1200 may include the following method steps: Step 1201 of independently differentiating data corresponding to each x-ray point source. In step 1201, the phrase "independently differentiating data" refers to performing differentiation for the data corresponding to one source position independently from data of another source position. The differentiation that is performed uses a view dependent derivative (i.e., the calculation involves more than one view, but these views are from the same source point). The method 1200 may further include Step 1202 of applying a weight to account for data overlap in a trans-axial direction (In an embodiment, this weight may be the same as the weight used in the feathering portion of the rebinning step of the related art algorithm described above). The step 1202 may include weighting each differentiated data point by either 1 or −1 based on an orientation of its corresponding ray relative to the selected lines. In an embodiment, the weighting step 1202 may be performed by multiplying the differentiated data by signum(sin(alpha-alpha*)), where alpha is a fan angle and alpha* is a fan angle of a ray that points parallel to the direction that the Hilbert Transform is performed (or orthogonal to the direction of the Hilbert Transform Inversion). In one embodiment, the fan angle of the ray may point in the +y direction. (In an alternate embodiment, the −y direction can be used provided the direction of the Hilbert Transform Inversion is reversed). The method 1200 may further include a Step 1203 of weighting the resulting data to account for the direction of rays relative to a direction orthogonal to a direction of a Hilbert transform inversion. The method 1200 may further include a Step 1204 of applying an embodiment of the TOM-windowing technique described herein. The method 1200 may further include a Step 1205 of performing 3D backprojection. The method 1200 may further include a Step 1206 of performing a Hilbert transform inversion along the predefined set of lines. The method 1200 may further include a Step 1207 of outputting a reconstructed volume. The reconstructed volume may be a three-dimensional representation of an object scanned by an inverse geometry computed tomography ("IGCT") system. The method 1200 may further include a step 1208 of applying feathering to a TOM-windowing edge during backprojection.

In an embodiment, the multiple x-ray point sources referenced herein with respect to the various methods described herein may be distributed at least longitudinally. Additionally, multiple x-ray point sources that are distributed at least longitudinally may further include multiple trans-axial x-ray point sources. The multiple trans-axial x-ray point sources may be distributed along an iso-centered arc.

One example of a technique that may be used to apply the Hilbert transform inversion is described in: F. Noo, R. Clackdoyle and J. Pack, "A two-step Hilbert Transform method for 2D Image Reconstruction," *Phys. Med. Biol.*, vol. 49 (2004), pp. 3904-3923. However, in other embodiments, other techniques for applying a Hilbert transform inversion along a predefined set of lines may be used.

Discrete View Sampling

The binary windowing operation referenced above may generate artifacts because only a finite number of discrete view samples will be taken during actual scanning. To see this, consider the diagram 1300 of FIG. 13 and the diagram 1400 of FIG. 14. Referring to FIG. 13, a reconstruction point X is shown. A line 1301 (called the "generalized pi-line" passes through and corresponds to the reconstruction point X. As used herein, the term "generalized pi-line" refers to a line segment that has both of its endpoints on the source trajectory. The term "pi-line" is similar, but is typically used only for a helical source trajectory.

Source samples (shown as stars) 1303 and 1304 are positioned on the same side of the reconstruction point X at either end of the pi-line 1301. A u-shaped segment 1302 (called the "pi-segment") extends to the opposite side of the reconstruction point X, passes through two additional source samples 1305 and 1306, and connects to either end of the pi-line 1301.

The endpoints of the pi-line 1301 are closer to the pair of source samples 1303 and 1304 just outside the pi-segment 1302 than they are to the pair of source samples 1305 and 1306 just inside the pi-segment 1302. However, application of discrete TOM-windowing rejects the information from the source samples 1303 and 1304 completely. This effectively approximates the true pi line 1301 as being the dashed line 1307 (e.g., the pi-line by sampling), the endpoints of which are on the pi-segment 1302. One endpoint of the pi-line by sampling 1307 is on the pi-segment 1302 between the source sample 1305; the other endpoint of the pi-line by sampling 1307 is on the pi-segment 1302 between the source sample 1306 and the other endpoint of the true pi-line 1301.

FIG. 14 is a diagram 1400 illustrating a feathering region 1401 that may be applied to the TOM-window boundaries 711, 712 to mitigate this artifact (e.g., the pi-line by sampling 1307). In an embodiment, the feathering region 1401 may be created using a feathered windowing operation.

Figure 15:
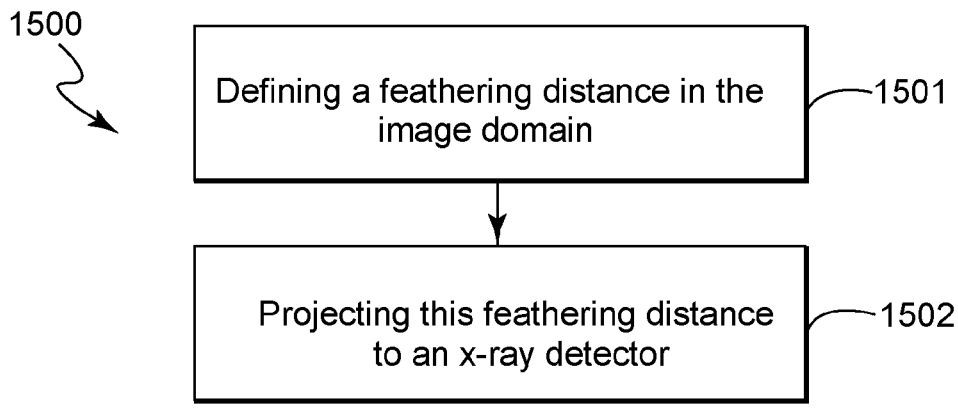
FIG. 15 is a flowchart that illustrates an embodiment of a method of performing a feathered windowing operation.

FIG. 15 is a flowchart 1500 that illustrates an embodiment of a method of performing a feathered windowing operation. At step 1501, a feathering distance may be defined in the image domain. At step 1502, this feathering distance may then be projected to an x-ray detector. In this way, (referring to FIGS. 13 and 14) weights that are used for a given voxel X as an x-ray point source moves into the pi-segment 1302 are compatible with the weights used for the voxel X as the x-ray point source moves out of the pi-segment 1302. As used herein, "Compatible" means that a sum of the weight at any position of the x-ray source point and the weight at a conjugate position (e.g., the position that shares a plane with both the voxel X and the initial position of the x-ray point source, the plane being parallel to the rotation axis) in one. If the feathering window were defined on the detector this consistency could not exist.

An exemplary embodiment of a method of performing the feathering operation is now described in further detail. Consider a voxel position V at (x,y,z) and the following two points: V+ at (x,y,z+k) and V− at (x,y,z−k). The point V+ is just above V and the point V− is just below V. The projections of these points onto the detector are denoted as P, P+, and P−, respectively. When both P+ and P− lie in the TOM-window, a weight of one is given to the data prior to backprojection. When both P+ and P− lie outside the TOM-window, a weight of zero is applied before backprojection (or no backprojection is done onto V). When only one of the two points lies inside the TOM-window, the one inside is denoted as $P_i$ and the one outside is denoted as $P_o$. The point at the intersection of the TOM-window and the line segment connecting $P_o$ and $P_i$ is denoted as P*. "R" is then defined as the ratio of the distance between $P_i$ and P* to the distance between $P_i$ and $P_o$. Illustratively, R=0.5 when P is on the boundary of the TOM-window, R is greater than 0.5 when P is inside the TOM-window, and R is less than 0.5 when P is outside the TOM-window. R is then converted into a weight (W), which is then multiplied by the data prior to backprojection. If a linear feathering operation is used, W=R. In general, W=f(R) where f is a continuous function (preferably an increasing function) defined over the domain [0,1] that is such that f(0)=0 and f(x)+f(1−x)=1. For example, f could be defined as (1−cos(pi*x))/2.

In the above discussion, k is a feathering parameter multiplied by the voxel separation in z. As k approaches zero, the case of binary TOM-windowing is achieved. It was discovered that using a feathering parameter of 1 avoids residual errors in the discrete view sampling problem that was previously described above. In an embodiment, a feathering parameter of 1 may be used to indicate that the distance between V+ and V− is exactly two-voxels for any reconstruction point.

Figure 16:
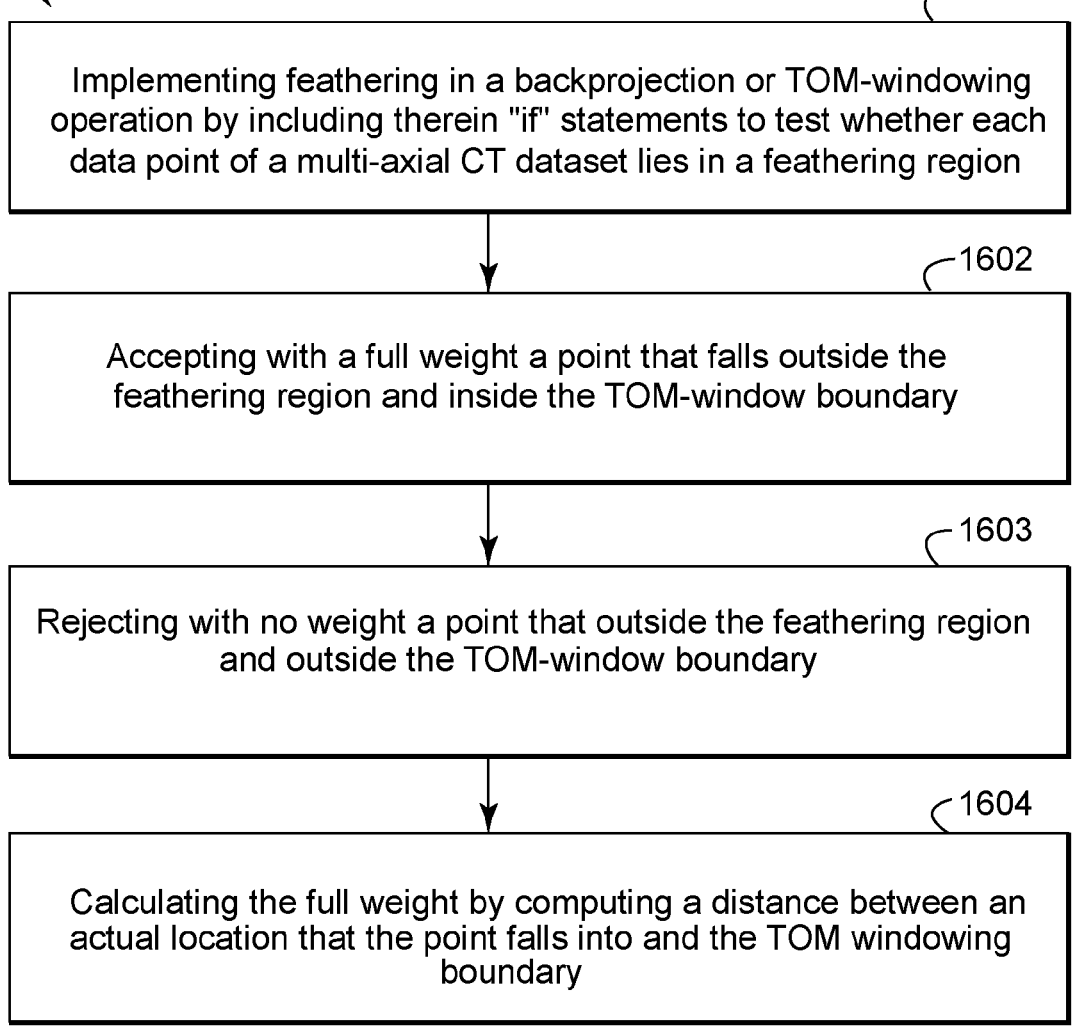
FIG. 16 is a flowchart that illustrates an embodiment of another method of performing a feathered windowing operation.

FIG. 16 is a flowchart 1600 that illustrates an embodiment of another method of performing a feathered windowing operation. An inner loop of the backprojection is performed over the z location(s) of the voxel(s). This enhances the efficiency because the z distance between V+ and V− is constant for all voxels that share an (x,y) location.

Referring to FIG. 16, at step 1601, implementation of the feathering in the backprojection operation may be accomplished in the backprojection or TOM-window operations by including additional "if" statements therein to test whether each projected data point in a multi-axial CT dataset lies in a feathering region. The feathering region may extend a predetermined distance on either side of a TOM-window boundary. In other words, an embodiment of a feathering region is a narrow band of the buffer region on the TOM boundary. As explained below, some points obviously inside the TOM boundary receive full weight and some points obviously far outside of the TOM boundary receive zero weight. Some points falling into a fuzzy buffer region, called the "feathering region," receive partial weight.

At step 1602, a point that falls far inside the TOM-window boundary may be accepted with full weight. At step 1603, a point that falls outside the TOM-window boundary may be rejected with no weighting. At step 1604, if a point falls into the feathering region, the current view may be accordingly weighted by computing a distance between an actual location that the point falls into and the TOM-windowing boundary. In one implementation, the weights may be given by linear interpolation, however, other types of interpolations known to a skilled artisan may also used.

The above explanation is for illustrative purposes only and is not meant to indicate the only method for implementing this algorithm. Rather, in other embodiments, other methods and/or modifications of the above method known to a skilled artisan may be used.

Multispot Interval TOM-windowing

Figure 17:
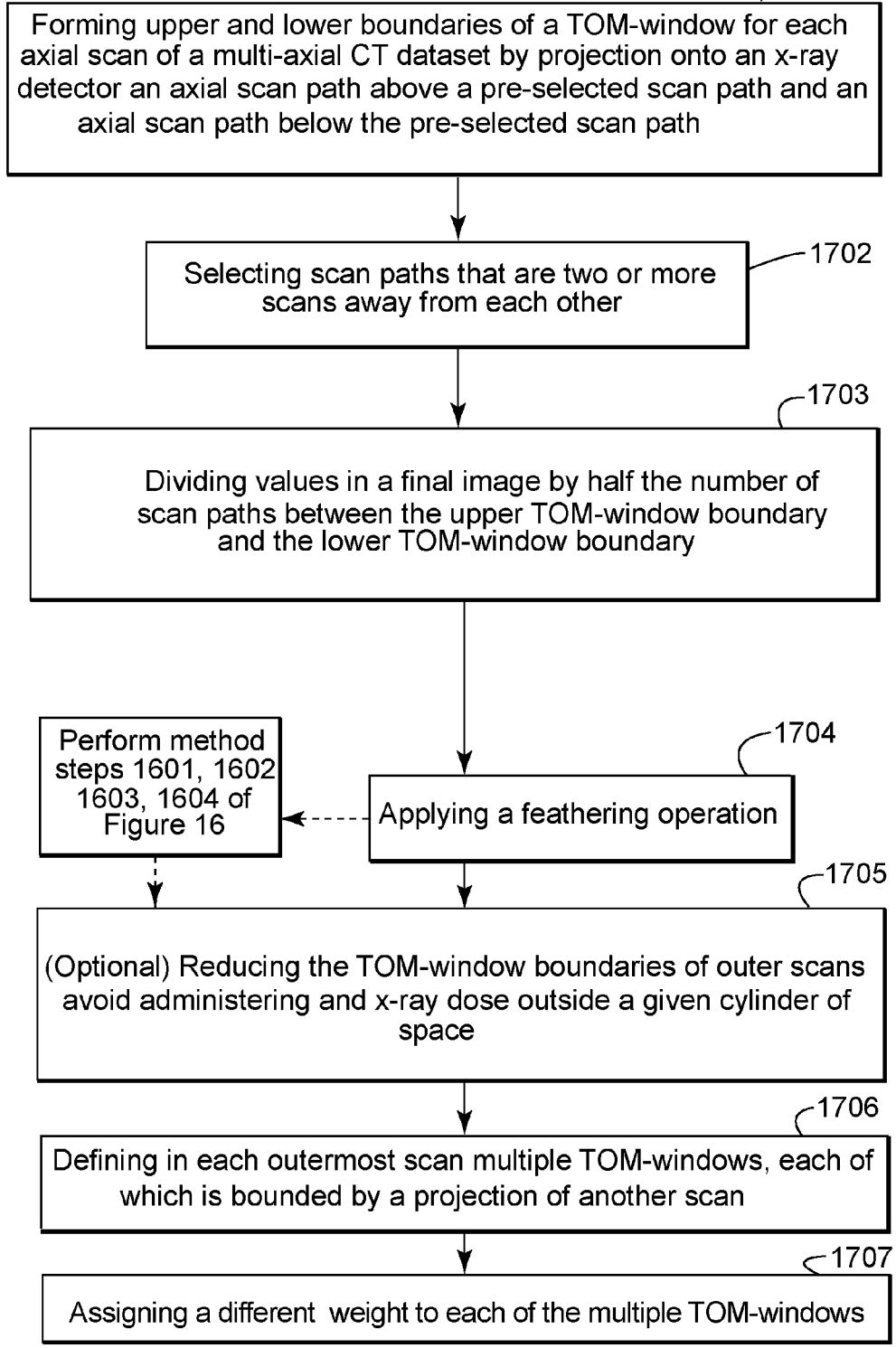
FIG. 17 is a flowchart illustrating an embodiment of a method of performing multispot interval TOM-windowing.

FIG. 17 is a flowchart 1700 illustrating an embodiment of a method of performing multispot interval TOM-windowing. The method steps represented by the flowchart 1700 illustrate that embodiments of the TOM-windowing approach described above with respect to at least FIGS. 15 and 16 may be used to combine data from axial scans that are separated in the axial direction. For example, if (as described above) the cone angle is chosen such that the radiation cones for adjacent axial scans are adjacent at the scanner rotation axis, only data from the two nearest axial scans need be used to reconstruct a given voxel since the voxel is not measured in the more distant axial scans. However, if (as described below) the cone angle is significantly larger relative to the scan separation distance, it is desirable to combine data from scans that are offset by a larger distance in the axial direction. This may be done using reconstruction techniques that apply the TOM-windowing approach described above, but with a larger TOM-window. Illustratively, if two sources are chosen to be longitudinally further apart than described above, the TOM-window size will be larger than before. Thus, instead of choosing two adjacent sources, two sources can be arbitrarily chosen to form a TOM window larger than a TOM-window formed from two adjacent sources.

At step 1701, as in the case of the original TOM-window, the boundaries of the larger TOM-window for each axial scan are formed by the projections onto an x-ray detector of an axial scan path above a pre-selected scan and an axial scan path below the pre-selected scan. At step 1702, however, for the larger TOM-window it is not the adjacent scan paths that are used/selected, but rather scan paths that are two or more scans away from each other (the actual number is limited by the size of the TOM-window that can be captured by the detector). At step 1703, the only further adjustment that is needed is to divide the values (e.g., CT values, image pixel values, etc.) in the final image by half the number of scans between an upper TOM-window boundary and the lower TOM-window boundary. For example, in an embodiment where the upper TOM-window boundary and the lower TOM-window boundary are each three scans away from the scan under consideration, the total distance between the upper and lower boundary scans will be six scans. Accordingly, the image will be divided by three. At step 1704, the feathering operation described above with respect to steps 1601, 1602, 1603, and 1604 of FIG. 16 may then be applied in the same way as for the original TOM-window.

At an optional step 1705, the TOM boundaries of the outer scans may be reduced to avoid administering an x-ray dose outside a given cylinder of space. In such an embodiment, each outermost scan (at step 1706) will need to have multiple TOM-windows defined therein, each of which is bounded by the projection of another scan. A different weight (at step 1707) is then given to each of the multiple TOM-windows. For example, in one embodiment, the smallest TOM-window may be given a weight of N, the next may be given a weight of N−1, and so on (with the largest TOM-window being given a weight of 1).

Radon Redundancy Compensation

All of the above approaches, including the slice-based recon (section 5), are non-exact. Only if a voxel happens to be in a plane of one of the x-ray point sources, and data from other x-ray point sources were not used, would it be artifact-free. On the other hand, in order to minimize image noise, it is desirable to use all the rays that pass through a given voxel, including those that have a larger cone-angle. This reduces the noise, but can increase cone-beam artifacts.

Figure 18:
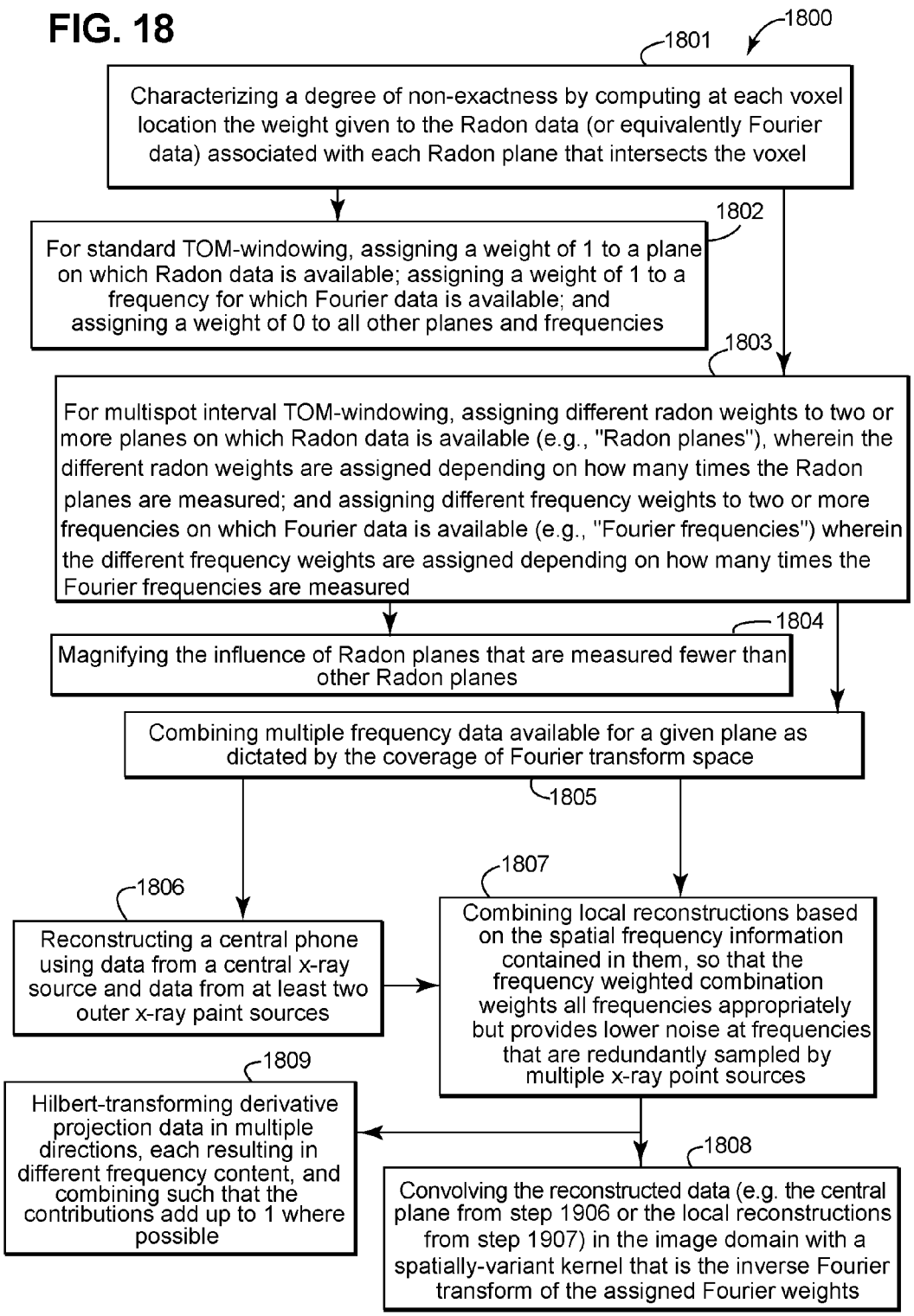
FIG. 18 is a flowchart of an embodiment of a method of performing Radon redundancy and/or Fourier frequency compensation.

FIG. 18 is a flowchart 1800 of an embodiment of a method of performing radon redundancy and/or Fourier frequency compensation while mitigating the increase in cone-beam artifacts. At step 1801, the degree of non-exactness may be characterized by computing at each voxel location the weight given to the Radon data (or equivalently Fourier data) associated with each plane that intersects the voxel. At step 1802, in the case of standard TOM-windowing, a weight of 1 is given to all planes on which data is available and a weight of 0 is applied to all other planes since the data corresponding to these planes is unavailable. As a result, there is little or nothing to be gained by manipulating the weighting of the data. However, in other cases (such as interval TOM-windowing), the Radon planes (or the Fourier frequencies) are weighted (at step 1803) differently depending on how many times they are measured.

Figure 4:
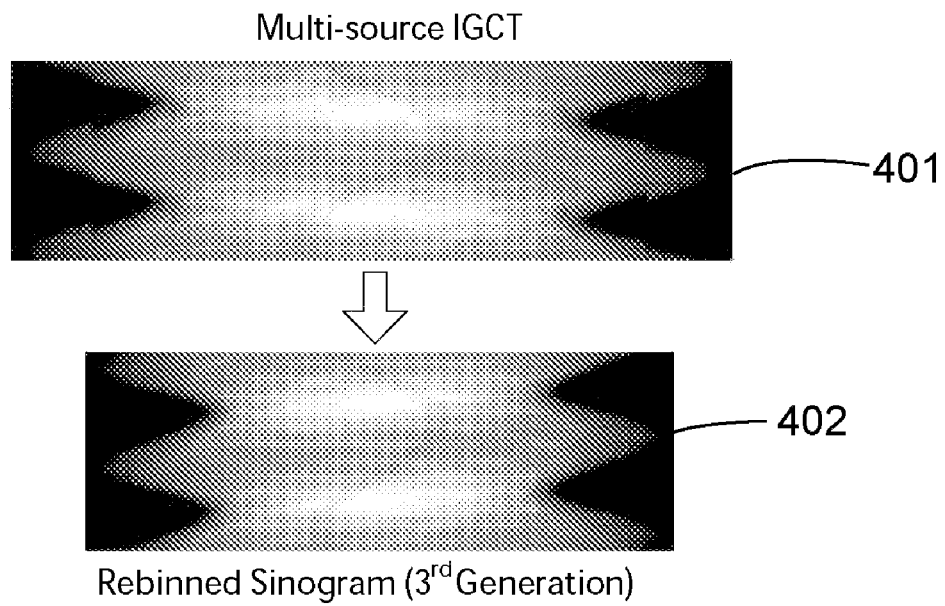
FIG. 4 contains two diagrams, one of which represents raw multi-source IGCT data, the other of which represents the multi-source IGCT projection data after a rebinning operation.
Figure 5:
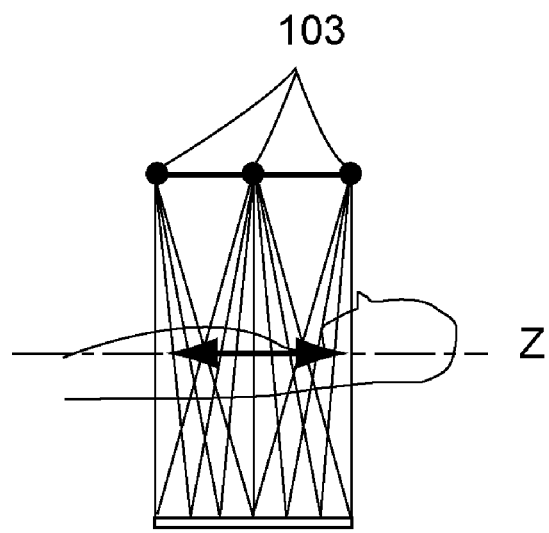
FIG. 5 is a diagram illustrating how the re-binned multi-source IGCT projection data of FIG. 4 can be associated with x-ray point sources offset along the z-axis and thereafter reconstructed using a conventional 3D cone-beam reconstruction algorithm.
Figure 6:
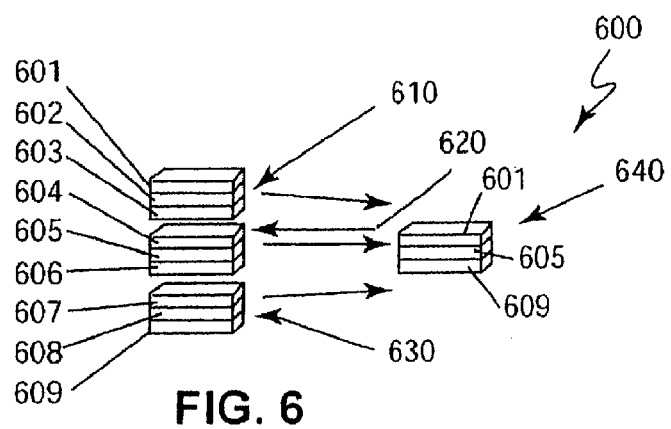
FIG. 6 is a diagram illustrating a method for performing reconstruction of multi-slice IGCT image data.

This can be accounted for (at step 1804) using a non-stationary operator applied in the image domain, by magnifying the influence of planes that are measured fewer times than other planes. A similar reasoning is possible for the Fourier domain: (at step 1805) when multiple frequency data are available for a given plane, they may be combined in a way dictated by the coverage of Fourier transform space. For example, embodiments of the methods described herein may be used in and/or explained with reference to the CT system architecture of FIG. 6. For example, if an embodiment of the method 1800 were used in the system architecture of FIG. 6, the central plane 605 may be reconstructed (at step 1806 of the method 1800) using data from the central source ring 605 and data from the outer sources 601 and 609. In an embodiment, a reconstruction using only the data from the central source ring 605 is exact while the reconstruction using only data from the outer sources 601 and 609 is not, due to missing spatial frequencies. Viewed in frequency space, each data set contributes information for some spatial frequencies. Thus, in an embodiment of the method 1800, the data from the central source ring 605 provides information for all frequencies while the data from the outer sources 601 and 609 provides information for some, but not all, frequencies.

In an embodiment, the local reconstructions may be combined (at step 1807) based on the spatial frequency information contained in them, so that the frequency weighted combination weights all frequencies appropriately but provides lower noise at frequencies that are redundantly sampled by multiple source rings. One approach to achieve this convolves the data (at step 1808) in the image domain with a spatially-variant kernel that is the inverse Fourier transform of the desired Fourier weights.

Another approach achieves the same effect (at step 1809) by Hilbert transforming the derivative projection data in multiple directions, each resulting in different frequency content, and combining such that the contributions add up to one where possible. For example, take a voxel in the plane of a first x-ray point source, and consider reconstructions obtained by the following four (non-limiting, exemplary) strategies:

(A) Using data from an x-ray point source 1 with Hilbert transform applied in planes tangent to the path of the x-ray point source 1 gives all desired frequencies;

(B) Using data from the x-ray point source 1 with Hilbert transform applied in planes tangent to the path of an x-ray point source 2 eliminates some frequencies close to the z-direction;

(C) Using data from x-ray point source 2 with Hilbert transform applied in planes tangent to the path of x-ray point source 2 has some missing frequencies close to the z-direction; and (D) Using data from x-ray point source 2 with tilted Hilbert transform still has some missing frequencies close to the z-direction.

Combining for example 2*A−B+C results in a more uniform frequency content. In an embodiment, this method may be modified, for reconstruction in other planes, by changing the tilt of the filtering directions in A-D depending on the location on the detector, and combining accordingly.

Figure 19:
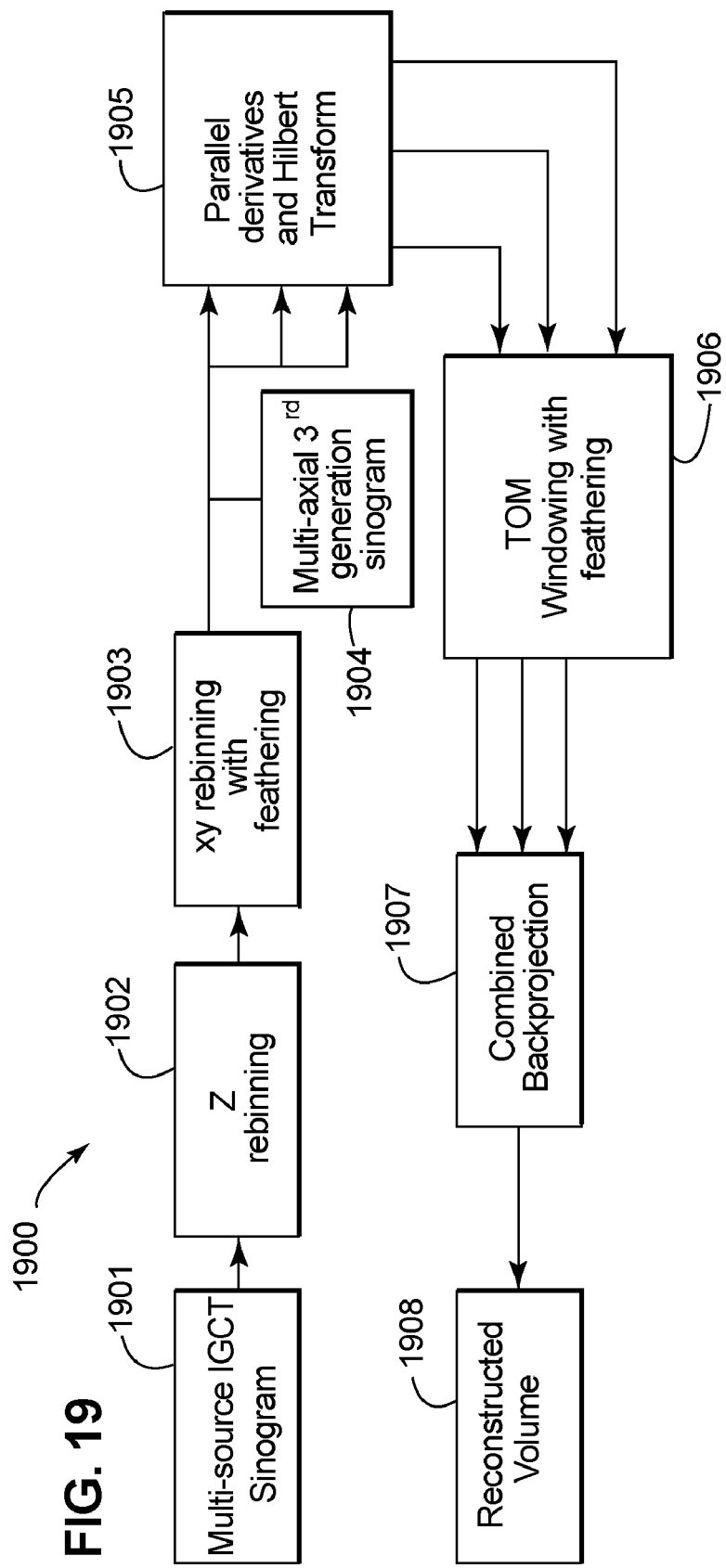
FIG. 19 is a flowchart illustrating an embodiment of a method that comprises a TOM-window based reconstruction approach with rebinning.
Figure 20:
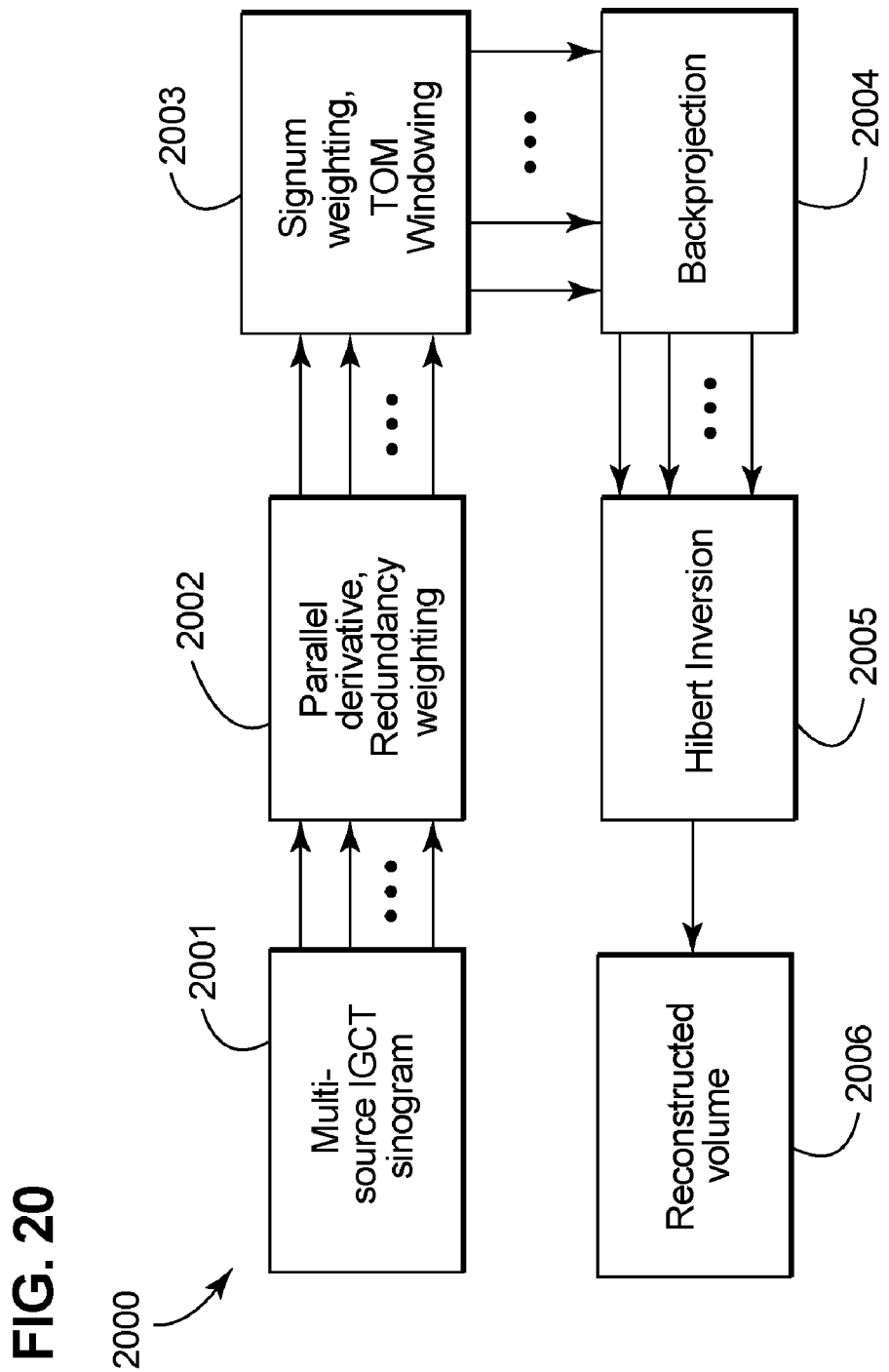
FIG. 20 is a flowchart of an embodiment of a method that comprises a TOM-window based reconstruction approach without rebinning.

FIGS. 19 and 20 are block diagrams of embodiments of methods of window-based cone-beam reconstruction for multi-axial CT datasets. The CT datasets may be acquired using longitudinally-offset x-ray beams emitted from multiple x-ray point sources, which may be distributed at least longitudinally along an iso-centered arc.

FIG. 19 is a flowchart 1900 of method steps that comprise a TOM-window based reconstruction approach with rebinning. Referring to FIG. 19, at step 1901, a multi-source IGCT sinogram is obtained. At step 1902, a rebinning operation is performed in "z". At step 1903, an "xy" rebinning operation, with feathering, is performed to yield a multi-axial $3^{rd}$ generation sinogram 1904. The multi-axial $3^{rd}$ generation sinogram 1904 is then processed (at step 1905) using parallel derivatives and Hilbert transforms. At step 1906, a TOM-windowing operation with feathering is performed (as previously described). At step 1907, the data resulting from the TOM-windowing operation with feathering is reconstructed using one of the combined backprojection techniques previously described. The result of the steps 1902, 1903, 1905, 1906, and 1907 is a reconstructed volume 1908. In addition to the advantages previously mentioned, the reconstructed volume 1908 may be substantially free of artifacts.

FIG. 20 is a flowchart 2000 illustrating method steps that comprise a TOM-window based reconstruction approach without rebinning. At step 2001, a multi-source IGCT sinogram is obtained. At step 2002, the multi-source IGCT sinogram is processed using parallel derivatives and redundancy weighting as previously described. At step 2003, the data resulting from step 2002 is further processed using signum weighting, and TOM-windowing with feathering (again, as previously described). At step 2004, backprojection is performed. At step 2005, a Hilbert Inversion is performed. The result of steps 2002, 2003, 2004, and 2005 is a reconstructed volume 2006. In addition to the advantages previously mentioned, the reconstructed volume 2006 may be substantially free of artifacts.

FIG. 21 is a flowchart of an embodiment of a method 2100 of performing analytic reconstruction for a multi-axial, inverse geometry CT dataset. The method 2100 may include a step 2101 of obtaining projection data from the multi-axial, inverse geometry CT dataset. The method 2100 may further include a step 2102, which may comprise at least one of a) rebinning data from one or more trans-axially-offset x-ray point sources into a third-generation dataset (step 2104), b) applying to the projection data a derivative that parallels a trajectory of the one or more trans-axially offset x-ray point sources (step 2105), and c) applying a Hilbert transform to the projection data after the derivative step, or to image data after backprojection (step 2106). The method 2100 may further include a step 2103 of applying a trajectory opposite mapping ("TOM")-window to the projection data before or during the backprojection. In an embodiment, the TOM-window may be applied with a half-pixel ship to the projection data. The method 2100 may further include a step 2107 of outputting a reconstructed volume that is free or substantially free of artifacts. The reconstructed volume may be a three-dimensional representation of an object scanned by an inverse geometry computed tomography ("IGCT") system.

GLOSSARY

The following terms, as used herein, may comprise at least the following non-limiting definitions.

Longitudinally—aligned in the direction of a rotation axis; illustratively, along a z-direction Trans-axially—across two-dimensions and/or in a plane (xy-plane) perpendicular to the rotation axis (illustratively, the z-axis).

Fan-beam geometry—$3^{rd}$ generation CT geometry with a single x-ray source and linear array (1D) detector.

Cone-beam geometry—$3^{rd}$ generation CT geometry with single x-ray source and multi-row (2D) detector.

Axial scan—a rotational scan without movement of a patient table.

Helical scan—a rotational scan with movement of a patient table.

Re-binning—the re-arrangement of a dataset corresponding to a new acquisition geometry or coordinated system.

Feathering—gradually changing a weighting or contribution of two partially overlapping datasets to achieve a smooth transition between them.

Iso-centered arc—an arc whose center lies on the rotation axis of a CT scanner

While embodiments of the invention have been described with reference to a rotating gantry system, embodiments of the invention can also be applied to table top systems where the object rotates, or applied to any other medical or non-medical scanner where the projection geometry is similar or analogous to the geometry described above.

A detailed description of various embodiments of the invention has been provided; however, modifications within the scope of the invention will be apparent to persons having ordinary skill in the above-referenced technological field. Such persons will appreciate that features described with respect to one embodiment may be applied to other embodiments.

What is claimed is:

1. A method of window-based cone-beam reconstruction for a multi-axial Computed Tomography (CT) dataset, wherein the CT dataset is acquired using longitudinally-offset x-ray beams emitted from multiple x-ray point sources distributed at least longitudinally, wherein the multiple x-ray point sources distributed at least longitudinally further includes multiple trans-axial offset x-ray point sources, the method comprising:

obtaining projection data from the multi-axial CT dataset;

applying to the projection data a derivative that parallels a trajectory of the trans-axially offset x-ray point sources applying a Hilbert transform to the projection data after the derivative step;

performing backprojection; and outputting a reconstructed volume, wherein the reconstructed volume is a three-dimensional representation of an object scanned by an inverse geometry computed tomography ("IGCT") system, and wherein backprojection for each trans-axial x-ray point source is done independently of the data from other x-ray point sources.

2. The method of claim 1, wherein the multiple trans-axial x-ray point sources are longitudinally distributed along an iso-centered arc.

3. The method of claim 1, further comprising:

applying a trajectory opposite mapping ("TOM")-window to the projection data prior to or during the backprojection.

4. The method of claim 1, further comprising:

applying the Hilbert transform with a half-pixel shift.

5. A method for analytically reconstructing a multi-axial Computed Tomography (CT) dataset comprised of one or more axial scans, wherein the CT dataset is acquired using longitudinally-offset x-ray beams emitted from multiple x-ray point sources distributed at least longitudinally, the method comprising:

independently differentiating data corresponding to each x-ray point source;

applying a weight to the differentiated data to account for data overlap;

weighting the resulting data to account for a direction of rays relative to a direction orthogonal to a direction of a Hilbert transform inversion;

applying trajectory opposite mapping ("TOM")-windowing;

performing backprojection;

performing the Hilbert transform inversion along a set of predefined lines; and outputting a reconstructed volume, wherein the reconstructed volume is a three-dimensional representation of an object scanned by an inverse geometry computed tomography ("IGCT") system.

6. The method of claim 5, wherein the multiple x-ray point sources distributed at least longitudinally further includes multiple trans-axial x-ray point sources.

7. The method of claim 6, wherein the multiple trans-axial x-ray point sources are longitudinally distributed along an iso-centered arc.

8. The method of claim 5, wherein the step of applying a weight to the differentiated data further comprises:

weighting each differentiated data point by either 1 or –1 based on an orientation of its corresponding ray relative to the selected lines.

9. The method of claim 5, further comprising: applying feathering to the TOM-windowing during the backprojection.

10. The method of claim 9, wherein the step of feathering further comprises:

determining whether a data point lies in a feathering region and inside a TOM-window boundary;

accepting with full weight a point that falls outside the feathering region; and rejecting with no weight a point that falls outside the feathering region and outside the TOM-window boundary.

11. The method of claim 9, wherein the full weight is calculated by computing a distance between an actual location that the data point falls into and the TOM-window boundary.

12. The method of claim 9, wherein the step of applying feathering further comprises:

defining in an image domain a feathering distance on either side of predetermined TOM-window boundary; and projecting the feathering distance to an x-ray detector.

13. The method of claim 5, wherein the step of applying TOM-windowing further comprises:

forming upper and lower boundaries of a TOM-window for each axial scan of a multi-axial CT dataset by projecting onto an x-ray detector an axial scan path above a pre-selected scan path and an axial scan path below the pre-selected scan path;

selecting scan paths that are two or more scans away from each other;

dividing values in a final image by half a number of scan paths between the upper TOM-window boundary and the lower TOM-window boundary; and reducing TOM-window boundaries of one or more outer scan paths of each axial scan to avoid administering an x-ray dose outside a predetermined cylinder of space.

14. The method of claim 13, further comprising:

defining in each outer scan path multiple TOM-windows, each of which is bounded by a projection of another scan path; and assigning a different weight to each of the multiple TOM-windows.

* * * * *

UNITED STATES PATENT AND TRADEMARK OFFICE
CERTIFICATE OF CORRECTION

PATENT NO. : 7,778,386 B2
APPLICATION NO. : 11/741359
DATED : August 17, 2010
INVENTOR(S) : Yin et al.

It is certified that error appears in the above-identified patent and that said Letters Patent is hereby corrected as shown below:

On the Title Page, in Field (54), in Title, in Column 1, Line 2,
delete "MULT-SOURCE" and insert -- MULTI-SOURCE --, therefor.

On the Title Page, in Field (57), under "ABSTRACT", in Column 2, Line 10,
delete "combines" and insert -- combined --, therefor.

In Fig. 20, Sheet 11 of 12, for Tag "2005", in Line 1, delete "Hibert" and
insert -- Hilbert --, therefor.

In Column 1, Line 2, delete "MULT-SOURCE" and insert -- MULTI-SOURCE --, therefor.

In Column 4, Line 22, delete "cong" and insert -- cone --, therefor.

In Column 6, Line 26, after "evaluated)" delete "711".

In Column 6, Lines 39-47, delete "Referring to FIG. 7,.......detector 701." and
insert -- Referring now to Figure 8, adjacent point x-ray sources 705 and 706 (from Figure 7) are
shown, together with their respective symmetric cone angles 708 and 709. The TOM-windowing
concept illustrated in Figures 7 and 8 is based on the fact that the target area 703 (of Figure 7) may be
covered completely by patching x-rays from one point x-ray source (705) with x-rays from an adjacent
x-ray point source (706) after about half a rotation. --, therefor.

In Column 10, Line 8, delete "in" and insert -- is --, therefor.

In Column 10, Line 60, delete "inside the" and insert -- inside of the --, therefor.

Signed and Sealed this
Nineteenth Day of April, 2011

David J. Kappos
*Director of the United States Patent and Trademark Office*